Aug. 21, 1951  E. R. HERD  2,565,427
SEEDER
Filed Nov. 24, 1948  2 Sheets-Sheet 1
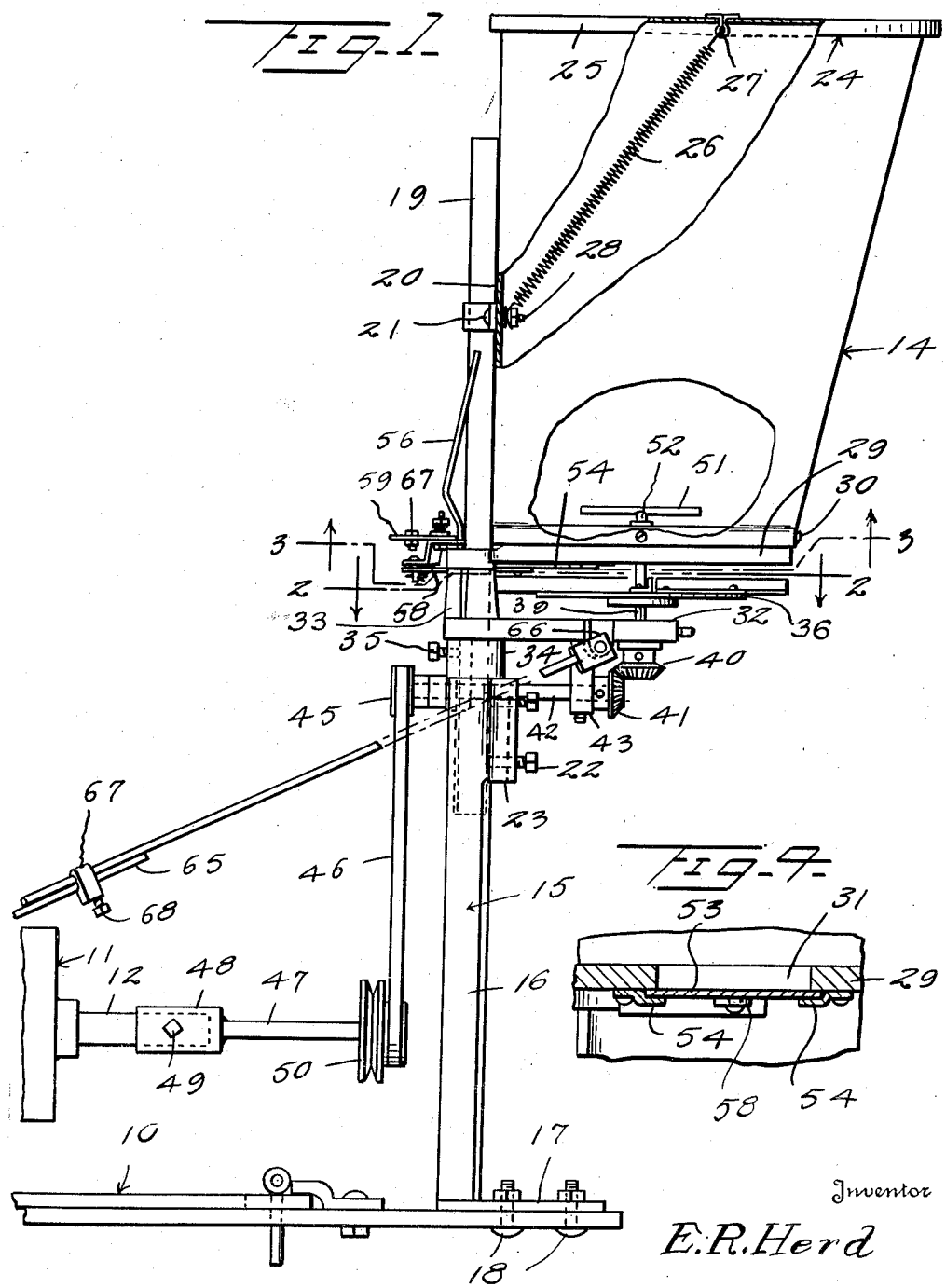

Aug. 21, 1951  E. R. HERD  2,565,427
SEEDER
Filed Nov. 24, 1948  2 Sheets-Sheet 2
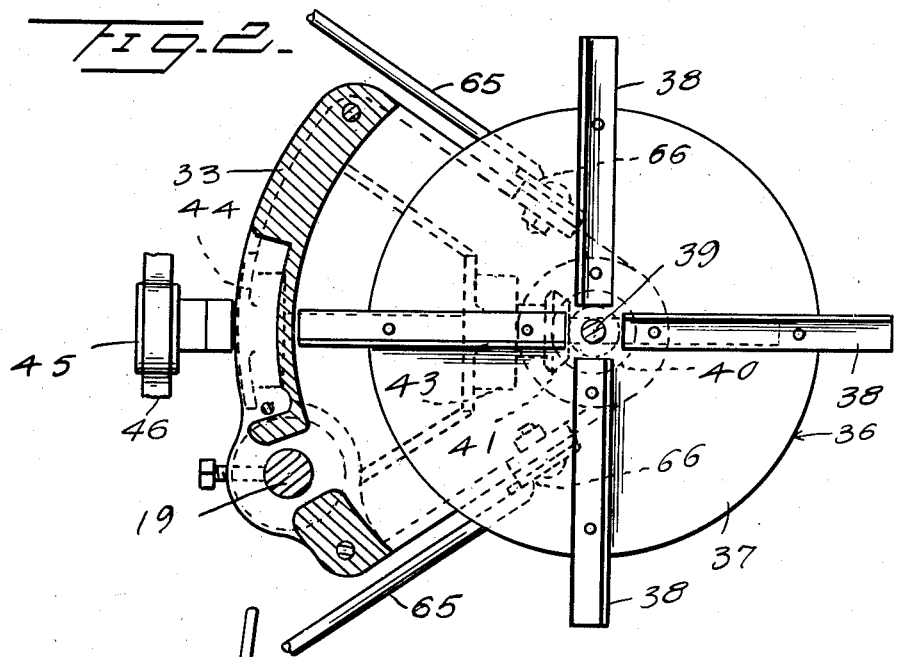
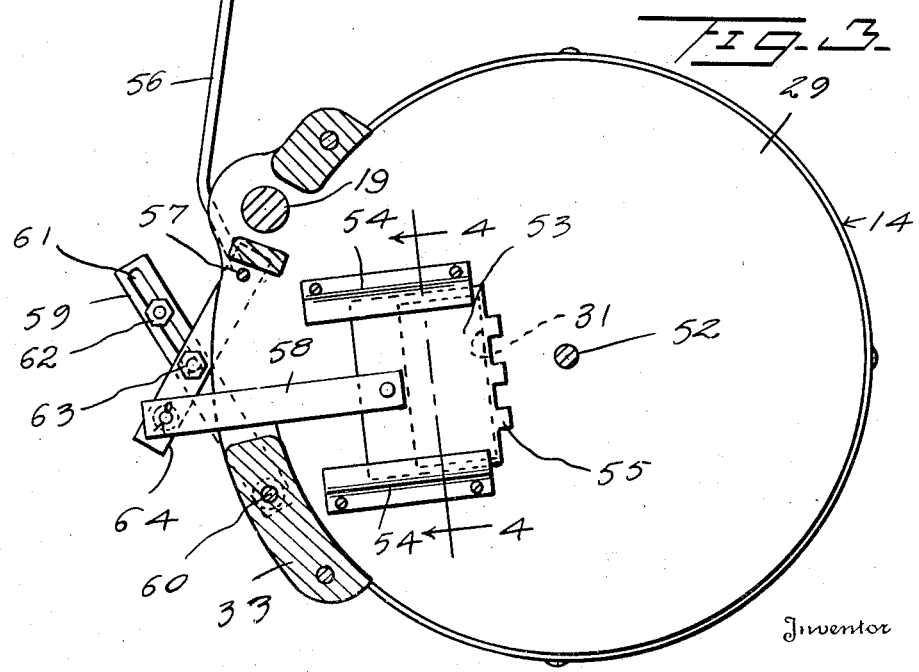
Inventor
E. R. Herd
By Kimmel & Crowell
Attorneys Patented Aug. 21, 1951

2,565,427

UNITED STATES PATENT OFFICE 2,565,427

SEEDER

Elmer R. Herd, Royal Center, Ind.

Application November 24, 1948, Serial No. 61,763

4 Claims. (Cl. 275—8)

1

This invention relates to a seed broadcaster attachment for mounting on a tractor.

An object of this invention is to provide a broadcaster for seed or other material which is adapted to be mounted on the drawbar of a tractor and operatively connected to the power take-off.

Another object of this invention is to provide a broadcaster attachment of this kind which includes a transversely disposed arcuate shield disposed at the forward side of the hopper base so that the seed or other material will be directed laterally and rearwardly.

A further object of this invention is to provide a broadcaster of this kind including an agitator in the lower portion of the hopper, and a valved discharge opening with adjustable means for regulating the size of the opening.

A further object of this invention is to provide a broadcaster of this kind including an improved and simplified mounting for the hopper so that the device may be quickly mounted on or removed from the tractor.

With the above and other objects in view, my invention consists in the arrangement, combination and details of construction disclosed in the drawings and specification, and then more particularly pointed out in the appended claims.

In the drawings,

Figure 1 is a detail side elevation, partly broken away and in section, of a seed or material broadcasting attachment for mounting on the drawbar of a tractor, constructed according to an embodiment of this invention, Figure 2 is a sectional view taken on the line 2—2 of Figure 1, Figure 3 is a sectional view taken on the line 3—3 of Figure 1, Figure 4 is a fragmentary sectional view taken on the line 4—4 of Figure 3.

Referring to the drawings, the numeral 10 designates generally the drawbar of a tractor extending from the rear thereof and the numeral 11 designates generally the power take-off for the tractor, which includes a drive shaft 12.

A hopper generally designated as 14 is adapted to be mounted on the drawbar 10 and is supported above the drawbar 10 by means of a standard or supporting bar generally designated as 15. The supporting bar 15 includes an angle bar 16 disposed in vertical position which has secured to the lower end thereof a horizontal base plate 17 adapted to be detachably secured by bolts or other fastening means 18 to the drawbar 10.

The hopper 14 has secured to the forward side

2 thereof a vertically disposed rod 19 secured to the forward wall 20 of the hopper 14 by clamps or clips 21. The rod 19 may be vertically adjusted relative to the hopper 14 and the lower portion of the rod 19 extends into the angle formed by the angle bar 16 and is adjustably secured therein by means of set screws 22 which engage through a bridging plate 23 secured by welding or other suitable means to the opposite sides of the angle bar 16.

The hopper 14 is formed of an upwardly flaring body and has mounted on the upper end thereof a cap or closure 24 formed with a marginal flange 25. The closure 24 is yieldably held on the upper end of the hopper 14 by means of a spring 26 secured at its upper end to a centrally disposed fastening member 27 which engages through the closure 24. The other or lower end of the spring 26 is secured to one of the bolts 28 securing the clip or clamp member 21 to the forward side of the hopper 14. In this manner the closure 24 may be swung upwardly and forwardly to an open position and will be held in the open position by means of the spring 26 and when the closure 24 is in closed position the spring 26 will yieldably maintain the closure in a closed position.

A base plate 29 or bottom is secured by fastening means 30 to the lower or small end of the hopper 14, and the plate 29 is formed with a rectangular discharge opening 31 extending transversely of the hopper bottom adjacent the forward portion thereof. A second plate 32, formed segment-like extending forwardly under the hopper and disposed in spaced parallel relation below the base plate 29, and the two plates 29 and 32 are secured together by means of an integral connecting web or shield 33 which is of longitudinally arcuate configuration.

The web or shield 33 is disposed at the forward portions of the plates 29 and 32 and provides a means whereby the seed or other material which is being broadcast will be held from discharge forwardly toward the tractor but to one side and to the rear thereof with an even sweeping delivery similar to that attainable by the hand of a human sower as the tractor is moving over the surface of the ground. The plate 32, which is the lower plate, is formed with a depending boss 34 through which the rod 19 engages and a set screw 35 is threaded into the boss 34 so as to adjustably hold the rod 19 against vertical movement relative to the boss 34.

A broadcasting wheel or member 36 is rotatably disposed between the two plates 29 and 32 and comprises a disc-shaped member 37 having secured to the upper side thereof radially disposed angle members 38 which constitute broadcasting blades. The wheel 36 is secured to a vertically disposed shaft 39 journalled through the lower plate 32 and the shaft 39 has fixed to the lower end thereof a bevelled gear 40 meshing with a bevelled gear 41 carried by a horizontally disposed shaft 42. The shaft 42 is journalled through one bearing 43 depending from the lower plate 32 and is also journalled through a second bearing 44 disposed laterally of the boss 34 and depending from the forward portion of the lower plate 32.

A grooved pulley 45 is fixed to the forward end of the shaft 42 and a belt 46 is trained about the pulley 45. A lower drive shaft attachment comprising a shaft 47 having a coupling sleeve 48 is secured to the rear end of the take-off shaft 12 by a set screw 49. The shaft 47 has fixed to the rear end thereof a grooved pulley 50 about which the belt 46 is also trained.

In order to provide a means whereby the material in the lower portion of the hopper 14 will be agitated, I have provided an agitating bar 51 which is secured to a vertically disposed shaft 52 rotatably engaging through the upper plate 29 and fixed to or formed as an integral part of the shaft 39. The amount of seed or other material which is discharged from the hopper 14 onto the broadcasting wheel 36 may be finely regulated by means of a horizontally movable valve plate 53 which is slidable in guides 54 secured to the lower side of the upper plate 29. The valve plate 53 is formed at its rear or inner edge portion with spaced lugs 55 or fingers which provide a means for separating the seed or material as the latter passes through the discharge opening 31 and drops onto the broadcasting wheel 36. The valve plate 53 is adapted to be adjusted by means of an adjusting lever 56 pivotally mounted on a pivot 57 engaging the forward portion of the plate 29.

The lever 56 is connected with the valve 53 by means of a pivoted link 58 which is pivotally connected to the lever 56 and also pivotally connected to the valve plate 53. The lever 56 is limited in its swinging movement to open position by means of an elongated link or bar 59 which is pivotally mounted on a pivot member 60 secured to the upper side of the plate 29. The bar 59 is formed with an elongated slot 61 within which a bolt or stop member 62 is mounted, the stop member 62 being disposed in the path of the swinging of the lever 56 and preferably the lever 56 has a bolt 63 extending through the arm 64 thereof which slidably engages in the slot 61. The longitudinal position of the stop member 62 will determine the degree of opening permitted for the valve 53.

The hopper supporting means comprising the standard 15 is adapted to be braced relative to the tractor by means of a pair of extensible bracing bars 65 which are secured at their forward and upper ends to ears 66 carried by the lower plate 32. These bracing members 65 are formed in overlapping pairs which, as shown in Figure 1, are adapted to be clamped together by means of a U-shaped clamp 67 through which a set screw 68 threadably engages.

In the use and operation of this device the broadcasting attachment is adapted to be secured to the drawbar 10 by the bolts 18. The belt 46 which engages about the lower pulley 50, constituting the driving pulley, may be tightened by adjusting the height of the rod 19 and of the base structure comprising the two plates 29 and 32. The coupling sleeve 48 is extended in telescoping relation over the take-off shaft 12 and secured by the set screw 49. When the seed or other material is disposed in the hopper 14, the valve 53 may be opened and the seed or other material in the hopper 14 will drop through the discharge opening 31 onto the rotating broadcasting wheel 36. The longitudinally arcuate shield 33 may be of any desired length so that the seed which is being broadcast by the wheel 36 will be broadcast both laterally and rearwardly, or if desired only in a substantially rear direction.

I do not mean to confine myself to the exact details of construction herein disclosed, but claim all variations falling within the purview of the appended claims.

What I claim is:

1. A seed broadcasting attachment for mounting on the drawbar of a tractor and for connection to the power take-off of the tractor, said attachment comprising an upright supporting bar, means adjustably mounting said bar on the drawbar, a hopper, a base fixed to said hopper, means securing said base and hopper to said bar, said base comprising an upper plate fixed to said hopper and formed with a valved discharge opening, a lower plate spaced from said upper plate, a longitudinally curved web connecting the forward portions of said plates together and constituting a shield, a broadcasting wheel between said plates, a vertical shaft carried by said lower plate rotatably supporting said wheel, and an operative drive connection between said wheel and the power take-off having a horizontal shaft, a pulley carried by said shaft vertically adjustable and aligned with a pulley carried by said power take-off with a flexible drive means extending between said pulleys.

2. A broadcasting attachment for mounting on the drawbar of a tractor and for connection to the power take-off of the tractor, said attachment comprising an upright angle bar, an extension carried by said bar for vertical extension above said drawbar, a bottom plate fixed to the lower end of said bar and adapted to be secured to the drawbar, a hopper, a vertical shaft rotatably centered in the hopper, a broadcasting wheel rotatably disposed below said hopper carried by said shaft, an operative connection between said shaft and the power take-off comprised of a horizontal shaft in driving engagement with said vertical shaft having a pulley positioned above said power take-off for driving alignment therewith and a belt dependent from said shaft pulley in driving engagement with the power take-off, and a curved shield disposed below said hopper at the forward portion of said wheel for directing seed broadcast by the wheel away from the tractor.

3. A seed broadcasting attachment for mounting directly above the drawbar of a tractor having a power take-off shaft, comprising, a base plate secured on said drawbar, a vertical standard secured to said base plate having an upwardly extending free end, a drive pulley carried by the power take-off adjacent the vertical standard, a vertical support carried by the free end of said standard and adjustably secured thereto, a horizontal shaft carried by the vertical support having a pulley drivingly spaced above the take-off pulley with flexible drive means extending therebetween, a segmental plate carried by the support with a reduced transverse section extending rearwardly, a vertical shaft rotatably mounted in said plate having a bottom end drivingly geared to said horizontal shaft, a broadcasting wheel mounted on said vertical shaft for rotation above said segmental plate, an arcuate shield spaced forwardly peripherally of said wheel and extending across said plate, and a seed hopper carried by said vertical support and positioned over said wheel having a bottom plate in close relationship with the top of said shield, said bottom plate having a valved rectangular opening angularly disposed relative to said shield to open in back thereof.

4. A seed broadcasting device as defined by claim 3, including a valve having planar fingers formed along one edge to provide for finger-like separation of the seed discharged onto the broadcasting wheel.

ELMER R. HERD.

REFERENCES CITED

The following references are of record in the file of this patent:

UNITED STATES PATENTS

| Number | Name | Date |
|---|---|---|
| 1,508,210 | Bangert | Sept. 9, 1924 |
| 1,633,821 | Mader | June 28, 1927 |
| 2,060,652 | Arnold | Nov. 10, 1936 |
| 2,187,448 | Currivan et al. | Jan. 16, 1940 |
| 2,334,376 | Bauer | Nov. 16, 1943 |
| 2,418,546 | Comtois | Apr. 8, 1947 |